United States Patent Office  3,382,333
Patented May 7, 1968

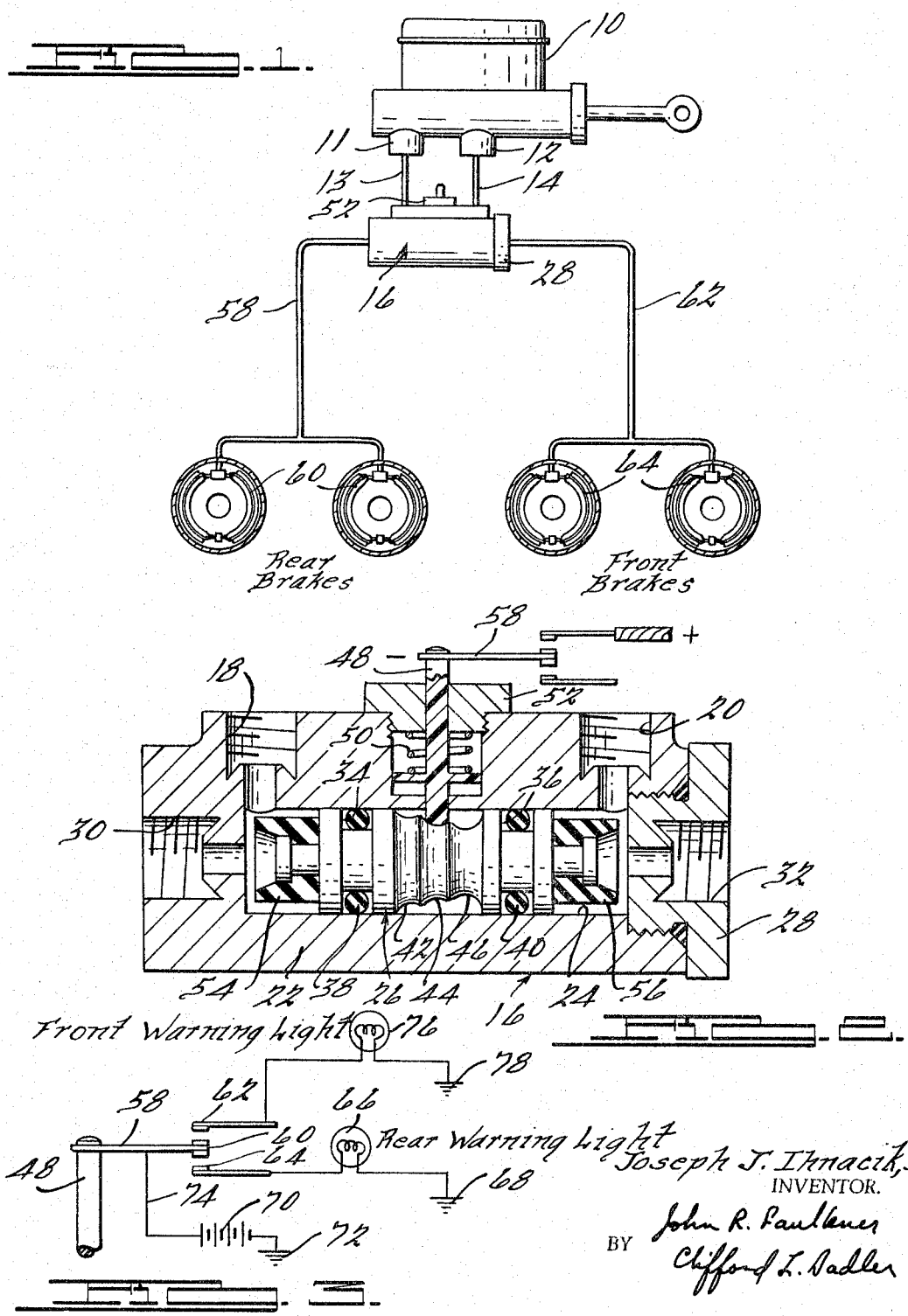

3,382,333
WARNING LIGHT SWITCH FOR SPLIT BRAKE SYSTEM
Joseph J. Ihnacik, Jr., Detroit, Mich., assignor to Ford Motor Company, Dearborn, Mich., a corporation of Delaware
Filed Dec. 10, 1965, Ser. No. 512,941
7 Claims. (Cl. 200—82)

ABSTRACT OF THE DISCLOSURE

Warning apparatus switch for a split or dual brake system having a circuit closing detent actuated by a pressure-responsive grooved piston that signals a pressure differential between the separate valves of the fluid system.

---

The present invention relates generally to automotive brake systems, and more particularly to a warning light for a split brake system.

In certain vehicle brake systems, a dual master cylinder is provided having two mutually independent pressure chambers each of which feeds a separate half of the brake system. With this type of arrangement, the master cylinder has a first pressure chamber that directs pressure fluid to the rear brakes and a second pressure chamber that feeds hydraulic fluid to the front brakes. In the event of a hydraulic failure in either the front half or rear half of the brake system, the other half is still operative to arrest movement of the vehicle.

A dual or split system has many advantages, the obvious one being the ability to supply partial braking even though a leak has occurred in the system. Partial braking, however, is adequate for emergency use only and the failure should be corrected as soon as is possible. The usual dual master cylinder will provide a change in "pedal feel" upon failure of half of the system. While the driver should be able to detect this change, it is considered advantageous to provide a positive warning to indicate failure in the system.

In view of this need, it is the principal object of the present invention to provide a visual or audible warning device for a split brake system that is responsive to a pressure differential resulting from a leak in a portion of the system.

In accordance with the preferred embodiment of this invention, a switch is provided having a piston that is exposed at its opposite ends to the pressure of the front and rear halves respectively of the hydraulic system. An electrical switch having a detent element that engages grooves in the piston is constructed to actuate or connect a power source with separate warning mechanisms such as a pair of lights located on the vehicle's instrument panel. The two lights are adapted to indicate failure in either the front or rear brake systems. The detent and groove arrangement assures that the switch will not function in response to minor pressure differences and that once the piston has moved to an extreme position, the warning light will remain on even after pressure in the good half of the brake system has been returned to normal.

The many objects and advantages of the present invention will become apparent upon consideration of the following description and the accompanying drawings in which:

FIGURE 1 is a schematic view of a brake system incorporating the present invention;
FIGURE 2 is a sectional view of a warning switch constructed in accordance with this invention; and
FIGURE 3 is a schematic drawing of the warning switch and related electrical circuitry.

Referring now to the drawings for a more complete understanding of this invention, FIGURE 1 discloses a dual master cylinder 10 having separate pressure outlets 11 and 12. Dual master cylinder 10 may be of the type described in my copending application Ser. No. 514,886, filed Dec. 20, 1965, and entitled Dual Master Cylinder for Brake System. The outlets 11 and 12 are connected to mutually independent pressure chambers situated within the dual master cylinder.

The outlet conduits 13 and 14 connect the outlet ports 11 and 12 with switch 16 illustrated in FIGURE 2. The conduit 14 for the front brakes is connected to the inlet port 20. The switch 16 includes a housing 22 having an axially extending bore 24. The ports 18 and 20 enter the housing 22 in a radial direction and are in communication with the bore 24. A piston 26 is slidably received within the bore 24 and is retained therein by a threaded cap 28.

An outlet port 30 communicates with the depth of the bore 24 and, therefore, it is in communication with the inlet port 18. Similarly, the cap 28 has an outlet port 32 which communicates with the adjacent portion of the bore 24 and the inlet port 20.

The piston 26 is provided with grooves 34 and 36 at its ends which receives O-ring seals 38 and 40. The O-rings 38 and 40 seals and separate the rear brake side of the system including the inlet port 18 and outlet port 30 from the front brake side of the system which include the inlet port 20 and outlet port 32. A series of axially spaced apart grooves 42, 44 and 46 are provided on the surface of the piston 26. As indicated in FIGURE 2, the grooves 42, 44 and 46 are of progressively increasing diameter. These grooves are engageable by a detent 48 that is pressed by a spring 50 in an inward direction. The spring is retained by a cap 52 threaded onto the housing 22.

As seen in FIGURE 2, the left end of the piston 26 carries a resilient sealing element 54 that is adapted to seal the outlet port 30. Similarly, a sealing element 56 is situated on the right-hand end of the piston 26 and is adapted to seal the port 32.

Referring back to FIGURE 1, the split brake system is completed by connecting a conduit 58 from the outlet port 30 of the warning switch 16 to the rear brake assemblies 60. Conduit 62 is connected to the outlet port 32 and provides communication with the front brake assemblies 64.

During normal operation, actuation of the master cylinder 10 will cause a pressure buildup in the lines 13, 14, 58 and 62 and brake assemblies 60 and 64. The pressure in the lines 13 and 58 for the rear brakes will be substantially the same as the pressure in the lines 14 and 62 for the front brakes. Because the detent 48 is spring pressed into the central groove 44, minor differences in pressure that may exist between the two ends of the piston 26 will not effect the location of that piston. In the event, however, of a pressure failure in one half of the system, the piston 26 will move in the direction of the failed system. For an example, if the rear brakes should fail making it impossible to develop hydraulic pressure in the lines 13 and 58, a pressure buildup occurring in lines 14 and 62 would cause the piston 26 to move to the left. As a result of this movement, port 30 would be closed by seal 54. The detent 48 would be snapped out of the central groove 44 into the adjacent groove 46. Similarly, if the pressure failure was in the front system, piston 26 would move to the right so that element 56 would seal the port 32 and the detent 48 would ride in the groove 42.

An electrical switching element 58 is carried by the detent 48 and has electrical contact 60 on its end that is engageable with switch contacts 62 or 64. When the piston moves to the left in response to a pressure differential indicating a failure in the rear brakes, the detent will move downwardly into the groove 46 and the contacts 60 and 64 will be closed. A light bulb 66 is in circuit with the contact 64 and with an electrical ground 68. A power source 70 having one end grounded at 72 is connected by wire 74 to the switching element 68. Thus, when the contacts 60 and 64 close, the light 66 is placed in series with the power source 70 and it is illuminated to indicate a rear brake failure.

Similarly, an electric light bulb 76 is connected between contact 62 and ground 78. When the piston 26 moves to the right, detent 48 will rest in the groove 42 forcing it upwardly causing the contacts 60 and 62 to close. Current will then flow through the light 76 to indicate a failure in the front brake system.

Due to the engagement between the spring pressed detent 48 and the grooves 42, 44 and 46, actuation of the master cylinder 10 after a brake failure will move the piston 26 to either an extreme right- or left-hand position and the piston 26 will remain in that extreme position after the brakes are released even though there is no pressure differential. In other words, a warning device according to the present invention does not provide a momentary light that comes on only when the brake pedal is depressed. Once the pedal is depressed after a failure has occurred, the piston will move to its extreme position and the warning light will come on and it will stay on to provide a continuous warning until the failure in the system has been corrected. Once corrected, piston 26 is returnable to its central position by a pressure buildup on the previously failed half of the system when the brakes are being serviced. This can be done by bleeding fluid from the side which had not failed.

The foregoing description presents the presently preferred embodiment of this invention. Modifications and alterations may occur to those skilled in the art that will come within the scope and spirit of the following claims. For an example, an audible signal may be substituted for the warning lights.

I claim:
1. A warning device for indicating a pressure differential between first and second hydraulic systems,
said warning device including a housing having a bore,
said bore having first and second end portions,
said first and second end portions being in communication with said first and second hydraulic systems, respectively,
a piston slidably positioned within said bore and interposed between said first and second end portions,
said piston being axially movable in response to a pressure differential between said first and second end portions,
seal means interposed between said piston and said bore and constructed for hydraulically separating said first and second end portions,
three axially spaced apart grooves formed in said piston,
said grooves having progressively increasing radial spacing from the axis of said piston,
a spring pressed detent constructed to engage said grooves one at a time,
said detent being displaceable upon axial movement of said piston,
a warning signal mechanism connected to said detent and constructed to be activated upon movement of said detent.

2. A device according to claim 1 and including:
said warning signal mechanism comprising a first warning signal portion, a second warning signal portion, means connected to said detent and constructed to activate the appropriate one of said first or second portions upon axial movement of said piston toward said first or second end portion in response to a pressure differential between said first and second end portion.

3. A device according to claim 1 and including:
a first warning signal mechanism circuit,
a second warning signal mechanism circuit,
an electrical power source,
double throw switching means connected to said detent and constructed to close the appropriate one of said first or second circuits upon axial movement of said piston toward said first or second end portion in response to a pressure differential between said first and second end portion.

4. A device according to claim 3 and including:
the housing of said warning device having first and second pressure inlets communicating with said first and second end portions,
said first and second pressure inlets being constructed for connection to one portion of said first and second hydraulic systems,
said housing having first and second outlets communicating with said first and second end portions,
said first and second outlets being constructed for connection to another portion of said first and second hydraulic systems,
said piston having first and second end carrying said first and second sealing elements constructed to sealably engage said first and second outlets one at a time upon axial movement of said piston.

5. A warning device for indicating a pressure differential between first and second hydraulic systems,
said warning device including a housing having a bore,
said bore having said first and second end portions,
said first and second end portions being in communication with said first and second hydraulic systems, respectively,
said housing having a port communicating with said first end portion,
a piston slidably positioned within said bore and interposed between said first and second end portions,
said piston being axially movable in response to a pressure differential between said first and second end portions,
said piston having one end carrying a sealing element constructed to sealably engage said port upon axial movement of said piston,
seal means interposed between said piston and said bore and constructed for hydraulically separating said first and second end portions,
a groove formed in said piston,
a spring pressed detent constructed to engage said groove and control axial movement of said piston,
said detent being displaceable upon axial movement of said piston,
a warning signal mechanism connected to said detent and constructed to be activated upon movement of said detent.

6. A device according to claim 5 and including:
said housing having a second port communicating with said second end portion,
said piston having a second end carrying a second sealing element constructed to sealably engage said second port upon axial movement of said piston, said first and second sealing elements sealing said first and second ports one at a time.

7. A device according to claim 6 and including:
the housing of said warning device having first and second pressure inlets communicating with said first and second end portions, respectively.

References Cited

UNITED STATES PATENTS

| | | |
|---|---|---|
| 2,764,176 | 9/1956 | Darquier. |
| 3,228,194 | 1/1966 | Blair. |
| 3,309,966 | 3/1967 | Cornillaud. |
| 1,217,513 | 2/1917 | Simmon _____ 200—82 |
| 2,535,940 | 12/1950 | Malvin _____ 200—82 |
| 2,847,182 | 8/1958 | Mancusi _____ 251—297 |
| 3,168,008 | 2/1965 | Bingel _____ 200—82 |

BERNARD A. GILHEANY, *Primary Examiner.*

H. BROOME, *Assistant Examiner.*